United States Patent Office 2,915,533
Patented Dec. 1, 1959

2,915,533
SYNTHESIS OF MEVALONIC ACID

Arthur F. Wagner, Princeton, N.J., assignor to Merck & Co., Inc., Rahway, N.J., a corporation of New Jersey No Drawing. Application February 15, 1957
Serial No. 640,342

11 Claims. (Cl. 260—343.5)

This invention relates to the synthesis of racemic 3,5-dihydroxy-3-methylpentanoic acid, also referred to as mevalonic acid, the corresponding lactone, β-hydroxy-β-methyl-δ-valerolactone, which exists in equilibrium with the acid in aqueous solution, and a salt of the acid, N,N' - dibenzylethylenediammonium bis - (3,5 - dihydroxy-3-methylpentanoate).

The method of the present invention is carried out in three stages consisting of (1) preparing 4-(2-tetrahydropyranyloxy)-2-butanone, a reactant in the new synthesis, (2) reacting the same with a lower ester of bromoacetic acid to obtain a lower ester of 3-hydroxy-3-methyl-5-(2-tetrahydropyranyloxy)pentanoic acid and (3) converting this intermediate to the desired mevalonic acid and lactone or salt of the acid.

The invention also includes the following new compounds:

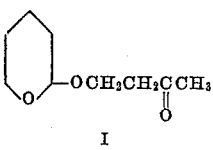  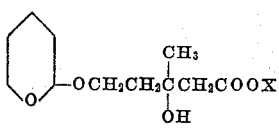  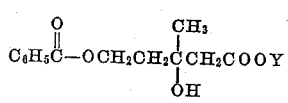

I  II  III

Formula I represents 4-(2-tetrahydropyranyloxy)-2-butanone, a reactant in the new synthesis. Formula II, in which X can be hydrogen, a lower alkyl group containing 1 to 6 carbon atoms or DBED/2 (one equivalent of dibenzylethylenediammonium), represents tetrahydropyranyloxy-substituted compounds obtained as intermediates in the synthesis. Formula III, in which Y can be hydrogen, or DBED/2, represents 5-benzoyloxy-substituted derivatives of the acid obtained in the new synthesis.

The products of the new synthesis, 3,5-dihydroxy-3-methylpentanoic acid (i.e., mevalonic acid), β-hydroxy-β-methyl-δ-valerolactone and N,N'-dibenzylethylenediammonium bis-(3,5-dihydroxy-3-methylpentanoate) (also known as the DBED salt of melvalonic acid), and the intermediates, 3 - hydroxy - 3 - methyl - 5 - (2 - tetrahydropyranyloxy)pentanoic acid and its DBED salt, are useful in minute quantities for promoting the growth of Lactobacillus acidophilus ATCC 4963 and certain other lactobacilli employed in the production of lactic acid and cottage cheese. These compounds are also useful for promoting the growth of chicks. Growth activity is measured by microbiological assay with Lactobacillus acidophilus ATCC 4963 by techniques essentially in accordance with known procedures. Growth activity is expressed in "units" for convenience. One-half maximal growth of Lactobacillus acidophilus ATCC 4963 is obtained when the nutrient medium contains 0.0005 unit of growth activity per ml.

The remaining new compounds of the present invention are useful in the preparation of the active compounds. The compound of Formula I, 4-(2-tetrahydropyranyloxy)-2-butanone, is an essential reactant in the synthesis of the present invention. The esters of Formula II are useful as intermediates in the synthesis of the active compounds. The benzoyloxy derivatives of Formula III may be used to produce mevalonic acid.

The second stage of the synthesis, in which the new reactant 4-(2-tetrahydropyranyloxy)-2-butanone is reacted with a lower ester of bromoacetic acid to produce a lower ester of 3-hydroxy-3-methyl-5-(2-tetrahydropyranyloxy)pentanoic acid, is preferably carried out in a liquid organic reaction solvent in the presence of zinc or magnesium. Preferably zinc is employed, in the form of granules, but zinc dust, zinc amalgam or a mixture of zinc and copper powders may be used. The term "lower ester" employed in the specification and claims denotes compounds containing from 1 to 6 carbon atoms in the ester group. It is preferred in this stage of the synthesis, to employ approximately equal molar quantities of reactants and reflux conditions of temperature and pressure with ether as the reaction solvent.

In the third stage of the synthesis, the conversion of the intermediate esters to the desired mevalonic acid and lactone or DBED salt of mevalonic acid, can be carried out in three ways; the method chosen depending inter alia upon the type of product desired. The simplest method of converting the intermediate esters consists of hydrolyzing both the ester and pyranyloxy groups in the molecule under acid conditions to produce 3,5-dihydroxy-3-methylpentanoic acid (i.e., mevalonic acid), and β-hydroxy - β - methyl - δ - valerolactone directly. Another method is to subject the intermediate ester to two separate hydrolysis reactions; one under basic conditions to convert the ester group to a carboxyl group and one under acid conditions to replace the pyranyloxy group with a hydroxy group. This method, although less direct than a single step acid hydrolysis, is preferable since it makes possible the choice of optimum conditions for the hydrolysis of both the ester and pyranyloxy groups thus providing improved yields of the desired mevalonic acid and lactone. The third method of converting the intermediate esters consists of a three-step operation including an initial hydrolysis under basic conditions to convert the intermediate ester to the corresponding 3-hydroxy-3-methyl-5-(2-tetrahydropyranyloxy) pentanoic acid, treatment of this acid with N,N'-dibenzylethylenediamine (i.e., DBED), to form the corresponding DBED salt, and hydrolysis of this salt under acidic conditions to replace the tetrahydropyranyloxy group with a hydroxy group. This method, which produces N,N'-dibenzylethylenediammonium bis-(3,5-dihydroxy-3-methylpentanoate) directly (i.e., DBED salt of mevalonic acid), is the preferred conversion since it separates the desired acid as a crystalline salt thus providing a product of increased purity. Conversion of the crystalline DBED salt to the corresponding acid or any of its useful derivatives, e.g., the amides, can be accomplished by conventional procedures.

The present invention is illustrated in detail by the specific examples below which describe the preparation of the 4-(2-tetrahydropyranyloxy)-2-butanone reactant; the synthesis of 3,5-dihydroxy-3-methylpentanoic acid (mevalonic acid) and β-hydroxy-β-methyl-δ-valerolactone and the DBED salt of this acid; the preparation of the intermediate pyranyloxy-substituted esters, the corresponding acid and its DBED salt; and the preparation of 5- benzoyloxy-3-hydroxy-3-methylpentanoic acid and its DBED salt.

EXAMPLE I

*Preparation of 4-(2-tetrahydropyranyloxy)-2 - butanone*

Equimolar quantities (0.59 mole) of 4-hydroxy-2-butanone (51.5 g.) and dihydropyran (48.7 g.) are mixed and 4 drops of concentrated hydrochloric acid are added. The mixture is cooled to keep the temperature at about 45° C. and then is allowed to stand overnight at room temperature. The reaction mixture is dissolved in 500 ml. of ether and the solution is washed with dilute aqueous sodium bicarbonate and then with water. The ether solution is dried over anhydrous magnesium sulfate, filtered and concentrated in vacuo to yield a product, $n_D^{26}$ 1.4492, which is distilled in vacuo to obtain 4-(2-tetrahydropyranyloxy)-2-butanone, B.P. 60–63° C./100 microns pressure, $n_D^{26}$ 1.4488.

EXAMPLE II

*Preparation of ethyl 3-hydroxy-3-methyl-5-(2-tetrahydropyranyloxy)pentanoate*

An equimolar mixture (0.32 mole) of 4-(2-tetrahydropyranyloxy)-2-butanone (55 g.) and ethyl bromoacetate (54 g.) in 200 ml. of ether is added slowly to a stirred mixture of 21 g. of granular zinc in 30 ml. of anhydrous ether. The rate of addition is such that the ether is refluxed gently. After all the reactants are added, the mixture is refluxed for 3 hours. The reaction mixture is poured into 200 ml. of cold 2 N sulfuric acid. The ether phase is separated and the aqueous phase is extracted with three 150-ml. portions of chloroform. The chloroform and the ether extracts are washed with 10% aqueous sodium bicarbonate, saturated aqueous ammonium sulfate and dried over anhydrous magnesium sulfate. The combined organic phases are concentrated in vacuo. The residue (55.3 g.) is distilled in vacuo. After two distillations 28 g. of ethyl 3-hydroxy-3-methyl-5-(2-tetrahydropyranyloxy)pentanoate, B.P. 96–98° C./100 microns pressure, $n_D^{25}$ 1.4562, $$d_{25}^{25}\ 1.054$$

$M_D^{25}$ 67.13 (calcd. 66.50), are obtained. Other lower esters of 3-hydroxy-3-methyl-5-(2-tetrahydropyranyloxy)pentanoate can be prepared as described above by substituting the appropriate methyl, propyl, butyl, pentyl or hexyl alcohol ester of bromoacetic acid for the ethyl ester employed in this example.

EXAMPLE III

*Acid hydrolysis of ethyl 3-hydroxy-3-methyl-5-(2-tetrahydropyranyloxy)pentanoate to 3,5 - dihydroxy - 3-methylpentanoic acid and lactone*

Five grams of ethyl 3-hydroxy-3-methyl-5-(2-tetrahydropyranyloxy)pentanoate are dissolved in 30 ml. of ethanol and 15 ml. of 1 N hydrochloric acid are added. The mixture is warmed on the steam cone and then is stirred at room temperature for several days. The mixture is neutralized with 15 ml. of 1 N sodium hydroxide and the solution is concentrated to dryness in vacuo. The dry residue is extracted with three 30-ml. portions of chloroform. The chloroform extracts are combined and concentrated in vacuo to yield a mixture of 3,5-dihydroxy-3-methylpentanoic acid (i.e., mevalonic acid), and the corresponding o-lactone. The pure lactone, β-hydroxy-β-methyl-δ-valerolactone, is isolated by a short-path, evaporative distillation of the mixture at about 90° C./0.3 mm.

EXAMPLE IV

*Successive basic and acid hydrolysis of ethyl 3-hydroxy-3-methyl-5-(2 - tetrahydropyranyloxy)pentanoate to 3, 5-dihydroxy-3-methylpentanoic acid and lactone*

Six grams of ethyl 3-hydroxy-3-methyl-5-(2-tetrahydropyranyloxy)pentanoate are dissolved in 25 ml. of ethanol and 10 ml. of 3 N sodium hydroxide is added. The mixture is warmed on the steam cone for 30 minutes. The reaction mixture is then cooled and acidified to pH 4 with hydrochloric acid. The product, 3-hydroxy-3-methyl-5-(2-tetrahydropyranyloxy) pentanoic acid, is obtained by extraction of the reaction mixture with ether and concentration of the washed and dried extract in vacuo.

3-hydroxy-3-methyl-5-(2 - tetrahydropyranyloxy) pentanoic acid (2.4 g.) is dissolved in 20 ml. of ethanol and 10 ml. of 1 N hydrochloric acid is added. The reaction mixture is warmed on the steam cone for 20 minutes. The solution is cooled and 10 ml. of 1 N sodium hydroxide is added. The solution is concentrated to dryness in vacuo and the residue is extracted with chloroform. The chloroform extract is filtered and concentrated in vacuo to yield a mixture of 3,5-dihydroxy-3-methylpentanoic acid (i.e., mevalonic acid), and its δ-lactone. The lactone, β-hydroxy-β-methyl-δ-valerolactone, is isolated by a short-path, evaporative distillation of the mixture at about 90° C./0.3 mm.

EXAMPLE V

*Conversion of ethyl 3-hydroxy-3 methyl-5-(2-tetrahydropyranyloxy)pentanoate to 3,5 - dihdroxy-3 - methylpentanoic acid and lactone by basic hydrolysis, treatment with N,N' - dibenzylethylenediamine and acid hydrolysis*

Ethyl 3 - hydroxy-3-methyl-5-(2-tetrahydropyranyloxy) pentanoate (6.1 g.) is dissolved in 30 ml. of ethanol and 10 ml. of 3 N sodium hydroxide is added. The mixture is warmed on the steam cone for 30 minutes, and then cooled, acidified to pH 4 and extracted with ether. The ether solution is washed with water, dried over anhydrous magnesium sulfate, filtered and concentrated in vacuo to yield 2.7 g. of oil. The oil is dissolved in about 100 ml. of ether and 2.7 g. of N,N'-dibenzylethylenediamine in 20 ml. of ether is added. The salt precipitates and is collected by filtration to yield N,N'-dibenzylethylenediammonium bis-[3-hydroxy-3-methyl-5-(2-tetrahydropyranyloxy)pentanoate], M.P. 137–139° C. It has an activity of 22.8 units per milligram in the L.A. 4963 assay referred to previously.

N,N' - dibenzylethylenediammonium (bis - [3-hydroxy-3-methyl-5-(2-tetrahydropyranyloxy)pentanoate] (3.3 g.) is suspended in 10 ml. of water and 12 ml. of 1 N hydrochloric acid is added and warmed on the steam cone for 10 minutes. The mixture is then cooled and 12 ml. of 1 N sodium hydroxide is added. The mixture is filtered and the solution lyophilized. The residue is leached with 25 ml. of hot methanol. The methanol solution is cooled and ether is added to precipitate N,N'-dibenzylethylenediammonium bis - (3,5 - dihydroxy - 3 - methylpentanoate), M.P. 122–123° C. A mixture of this sample with an authentic specimen of the salt also melts at 122–123° C.

EXAMPLE VI

*Preparaion of 5-benzoyloxy-3-hydroxy-3-methyl-pentanoic acid and the corresponding DBED salt*

Ten grams of N,N'-dibenzylethylenediammonium bis-(3,5-dihydroxy-3-methylpentanoate) are dissolved in 37 ml. of 1 N sodium hydroxide. The solution is extracted with ether and the ether extract washed with 15 ml. of water. The combined aqueous phases are stirred and cooled while 6 g. of benzoyl chloride are added dropwise. Sodium hydroxide (1 N) is added dropwise during the addition of benzoyl chloride to keep the pH at about 9. After being stirred for one hour, the reaction mixture is washed with chloroform. The aqueous phase is acidified to pH 3 with hydrochloric acid and extracted with two 75-ml. portions of chloroform. The product, 5-benzoyloxy-3-hydroxy-3-methylpentanoic acid, which at this stage is in the chloroform solutions, is obtained after washing the combined chloroform extracts with water, then drying over anhydrous magnesium sulfate, filtering and concentrating in vacuum.

The residue is leached with hot petroleum ether and then disolved in 8 ml. of methanol. N,N'-dibenzylethylenediamine (2.16 g.) is added, and the solution is diluted with about 80 ml. of ether. N,N'-dibenzylethylenediammonium - bis - (5 - benzoyloxy - 3 - hydroxy - 3 - methylpentanoate), M.P. 142–143° C., crystallizes from the solution. This compound, upon alkaline hydroylsis, yields mevalonic acid.

N,N'-dibenzylethylenediammonium bis-(3,5-dihydroxy-3-methylpentanoate), also known as the DBED salt of mevalonic acid, normally has an activity of about 40–50 units/mg. when assayed by the procedures referred to above. This salt is added to a basal diet in very small amounts when used for the promotion of growth in chicks. For example, increased growth has been noted in chicks fed on a basal diet supplemented with 20 mg. of the DBED salt (having 43 units of activity/mg.) per Kg. of final diet. This amounts to only 0.002% of DBED salt in the diet. The other active compounds described above are useful for promoting chick growth when employed in similar amounts based on the activity of the compounds.

The above specific examples of the method and compounds of the present invention are merely illustrative and are not to be construed as limiting the scope of the invention.

What is claimed is:

1. A method for the preparation of 3,5-dihydroxy-3-methylpentanoic acid and β-hydroxy-β-methyl-δ-valerolactone which comprises reacting 4-(2-tetrahydropyranyloxy)-2-butanone with a lower alkyl ester of bromoacetic acid in a liquid organic reaction solvent in the presence of a metal selected from the group consisting of zinc and magnesium, and hydrolyzing the resulting reaction product to produce 3,5-dihydroxy-3-methylpentanoic acid and β-hydroxy-β-methyl-δ-valerolactone.

2. The method of claim 1 in which the reaction solvent is ether.

3. A method for the preparation of 3,5-dihydroxy-3-methylpentanoic acid and β-hydroxy-β-methyl-δ-valerolactone which comprises reacting 4-(2-tetrahydropyranyloxy)-2-butanone with a lower alkyl ester of bromoacetic acid in a liquid organic reaction solvent in the presence of zinc and subjecting the resulting reaction product to hydrolysis under acid conditions to produce 3,5-dihydroxy-3-methyl-pentanoic acid and β-hydroxy-β-methyl-δ-valerolactone.

4. A method for the preparation of 3,5-dihydroxy-3-methylpentanoic acid and β-hydroxy-β-methyl-δ-valerolactone which comprises reacting 4-(2-tetrahydropyranyloxy)-2-butanone with a lower alkyl ester of bromoacetic acid in a liquid organic reaction solvent in the presence of a metal selected from the group consisting of zinc and magnesium, and subjecting the resulting reaction product to two hydrolysis reactions, the first under basic conditions and the second under acid conditions, to produce 3,5-dihydroxy-3-methyl-pentanoic acid and β-hydroxy-β-methyl-δ-valerolactone.

5. A method for the preparation of N,N'-dibenzylethylenediammonium bis - (3,5 - dihydroxy - 3 - methylpentanoate) which comprises reacting 4-(2-tetrahydropyranyloxy)-2-butanone with a lower alkyl ester of bromoacetic acid in a liquid organic reaction solvent in the presence of a metal selected from the group consisting of zinc and magnesium, hydrolyzing the resulting reaction product under basic conditions, treating the hydrolyzed product with N,N'-dibenzylethylenediamine, and hydrolyzing the resulting salt under acidic conditions to produce N,N'-dibenzylethylenediammonium bis-(3,5-dihydroxy-3-methylpentanoate).

6. A method for the preparation of N,N'-dibenzylethylenediammonium bis - (3,5 - dihydroxy - 3 - methylpentanoate) which comprises reacting 4-(2-tetrahydropyranyloxy)-2-butanone with ethyl bromoacetate in ether solution in the presence of zinc, hydrolyzing the resulting reaction product under basic conditions, treating the hydrolyzed product with N,N'-dibenzylethylenediamine, and hydrolyzing the resulting salt under acidic conditions to produce N,N'-dibenzylethylenediammonium bis-(3,5-dihydroxy-3-methyl-pentanoate).

7. 4-(2-tetrahydropyranyloxy)-2-butanone.

8. Ethyl 3-hydroxy-3-methyl-5-(2-tetrahydropyranyloxy) pentanoate.

9. 3 - hydroxy - 3 - methyl - 5 - (2 - tetrahydropyranyloxy)-pentanoic acid.

10. N,N' - dibenzylethylenediammonium bis - [3 - hydroxy-3-methyl-5-(2-tetrahydropyranyloxy)pentanoate].

11. A compound selected from the group consisting of (A) 3-hydroxy-3-methyl-5-(2-tetrahydropyranyloxy)-pentanoic acid, (B) lower alkyl 3-hydroxy-3-methyl-5-(2-tetrahydropyranyloxy) pentanoate, and (C) N,N'-dibenzylethylenediammonium bis - [3 - hydroxy - 3 - methyl-5-(2-tetrahydropyranyloxy)pentanoate].

References Cited in the file of this patent

UNITED STATES PATENTS

| | | |
|---|---|---|
| 2,199,986 | Dickey et al. | May 7, 1940 |
| 2,356,153 | Elderfield et al. | Aug. 22, 1944 |
| 2,386,640 | Strain | Oct. 9, 1945 |
| 2,436,645 | Hawkins et al. | Feb. 24, 1948 |
| 2,514,156 | Geyer et al. | July 4, 1950 |
| 2,676,184 | Hoehn | Apr. 20, 1954 |

FOREIGN PATENTS

| | | |
|---|---|---|
| 847,407 | France | June 26, 1939 |